United States Patent [19]

Pearce

[11] Patent Number: 5,230,298
[45] Date of Patent: Jul. 27, 1993

[54] AQUARIUM/TERRARIUM CROSSOVER BRIDGE ASSEMBLY

[75] Inventor: Arthur Pearce, Hicksville, N.Y.

[73] Assignee: Artaro & Company, Shirley, N.Y.

[21] Appl. No.: 939,092

[22] Filed: Sep. 2, 1992

[51] Int. Cl.$^5$ .............................................. A01K 63/00
[52] U.S. Cl. .................................................................. 119/5
[58] Field of Search ............................................. 119/5

[56] References Cited

U.S. PATENT DOCUMENTS

| | | | |
|---|---|---|---|
| 192,195 | 7/1877 | Palen et al. | |
| D. 243,703 | 3/1977 | Gamble | D30/8 |
| D. 248,782 | 8/1978 | Randall, Jr. | D30/99 |
| 1,576,462 | 3/1926 | Polzin | 119/5 |
| 1,943,417 | 1/1934 | Bringman | 119/5 |
| 2,059,927 | 11/1936 | Beck | 119/5 X |
| 2,512,678 | 6/1950 | Rice | 119/5 |
| 3,653,357 | 4/1972 | Sheidlower et al. | 119/1 |
| 3,903,844 | 9/1975 | Greenia | 119/5 |
| 3,921,583 | 11/1975 | DeShores | 119/5 |
| 3,991,715 | 11/1976 | Gibson, Jr. | 119/5 |
| 4,044,721 | 8/1977 | Foley et al. | 119/5 |
| 4,531,477 | 7/1986 | Crossman | 119/5 |
| 5,005,521 | 4/1991 | Strong | 119/5 |
| 5,067,439 | 11/1991 | Hand | 119/5 |

*Primary Examiner*—Gene Mancene
*Assistant Examiner*—Thomas Price
*Attorney, Agent, or Firm*—Alfred Walker

[57] ABSTRACT

A decorative A-frame type water transfer bridge is provided for selectively siphoning water from one or more aquarium fish tanks. A siphon pump evacuates the desired amount of air to cause the water to enter and fill the bridge. A bleeder valve with a visually perceptible air lock permits the user to control the exact amount of air to be evacuated without spillage of water or retention of unwanted air bubbles.

12 Claims, 5 Drawing Sheets

AQUARIUM/TERRARIUM CROSSOVER BRIDGE ASSEMBLY

FIELD OF INVENTION

This invention relates to an enhanced construction of an aquarium bridge for the purpose of separation of fish and tank for cleaning purposes with minimal shock and stress to the fish. It also allows coupling of tanks for quick and rapid expansion of aquarium growth.

BACKGROUND OF INVENTION

It is well recognized that an aquarium bridge is entertaining and visually stimulating. In addition, the present invention is beneficial to reduce the stress and shock to fish during the cleaning process by eliminating the netting and storage of the fish.

Fish bridges and other attachments for aquarium tanks are known in the art for providing similar visual effects. However, in prior art patent references of Polin (U.S. Pat. No. 1,576,426), Gibson Jr. (U.S. Pat. No. 3,991,715), Beck (U.S. Pat. No. 2,059,927) that are of a tubular design leave the possibility of fish getting caught and jammed inside the bridge. Also, due to size restrictions, these prior art patents eliminate the possibility of more than one fish crossing at the same time or the turning around of fish while fish swim inside the bridge. Moreover, often the prior art patents include a hollow arch which must be inverted under the water and then awkwardly raised with the water therein to provide a bridge with water for fish to swim in.

In contrast to the above prior art patents, the present invention does not have to be inverted to be filled, as it is filled in the working position. In comparison to the prior art patents of Bringman (U.S. Pat. No. 1,943,417) and Gibson Jr. (U.S. Pat. No. 3,991,715) the present invention does not need to be submerged into the tank and raised into an upright position with fluid therein, thereby causing turbulence in the tank and upsetting the fish.

Moreover, in the Bringman '417 patent, the bridge is constructed of glass and metal design, not allowing the complete visibility of the fish. In contrast, the present invention is of a completely plastic design allowing total transparency from all angles. Also, by being constructed of plastic and not glass, the fish and the aquarium owner benefit from a safer device.

While the Hand (U.S. Pat. No. 5,067,439), prior art reference includes an arch, the configuration design of Hand '439 is complicated and overly engineered, resulting in a unit that is difficult to fill and extremely time consuming in the initial set-up. Also, due to its electrical structure it is not energy efficient, and is costly to the consumer. Because Hand '439 uses mechanically pumped-in pressure to forcefully move air out of an arched bridge, there is a danger of explosive force. Moreover, Hand '439 requires manually installed cups to keep water from dripping back into tanks from the arch, which is not peaked like the arch of the present invention, into the tank. Furthermore, Hand's elbowed corners do not present a generally continuous arched surface, and interfere with efficient evacuation of air bubbles.

While both the Hand '439 prior art reference and the present invention are filled with already conditioned water, the present invention is filled by gravitational forces, as done in the Palen and Sexton '595 prior art reference (U.S. Pat. No. 192,595). However, the method described in Hand '439 utilizes a force-fed water fill-up creating intense explosive forces. The present invention eliminates the explosive forces and also does away with the need for an explosive proof valve.

A difference between the present invention and the Palen and Sexton '595 prior art reference is that Palen and Sexton utilizes a rounded arch bridge, which permits air bubbles to travel along the interior curved arch surface without being released at the suction top.

In contrast, the tapered, straight-walled arched bridge of the present invention funnels any air bubbles to a peaked center suction outlet, so that air can be captured in one bubble for withdrawal through the air exit tube of the present invention. Furthermore, the peaked arch of the present invention has a limited volume, such as 10 gallons of water for a 50 gallon tank, to eliminate the possibility of an accidental overflow. In contrast, the curved arch bridge of the Palen and Sexton '595 prior art reference permits more than half the total volume of water on the bridge tank system to reside in the bridge. Moreover, in Palen and Sexton '595, while it uses a suction pump with a flap valve, there is provided no control to prevent water from entering the outlet during the evacuation of water, and no visual check to verify that air has been completely removed.

In contrast, the present invention also utilizes a needle set bleeder valve and an air loop bubble trap to keep water out of the air siphon and to provide a visual check to visibly observe when the air has been completely removed as water begins to enter the air loop bubble trap.

In the prior art of DeShore (U.S. Pat. No. 3,921,583) there is provided a transfer tank system which interlinks tanks with each other by using fixed tubular bridges.

In contrast, the present invention interlinks two tanks with full use of the previous tank system, linking each together while at the same time providing an easily removeable and replaceable bridge for tank expansion and for preparing for cleaning—where the use of the bridge does not require draining of tanks before use.

OBJECTS OF THE INVENTION

It is therefore an object of the present invention to provide a decorative water holding container for aquarium tanks.

It is a further object to provide a water transfer bridge which efficiently directs air being evacuated to an outlet.

It is a further object to provide a means to control air flow in and out of a water transfer bridge.

It is a further object to provide a safe and efficient water transfer bridge for fish tank aquariums, which is an improvement over the prior art.

The above and other objects of the present invention will be apparent from the following description of the preferred embodiment, taken in consideration in connection with the accompanying drawings.

BRIEF DESCRIPTION OF THE DRAWINGS

The accompanying drawings show some of the various embodiments of the present invention, as noted in the appended claims.

DETAILED DESCRIPTION OF THE DRAWINGS

Figure 1:
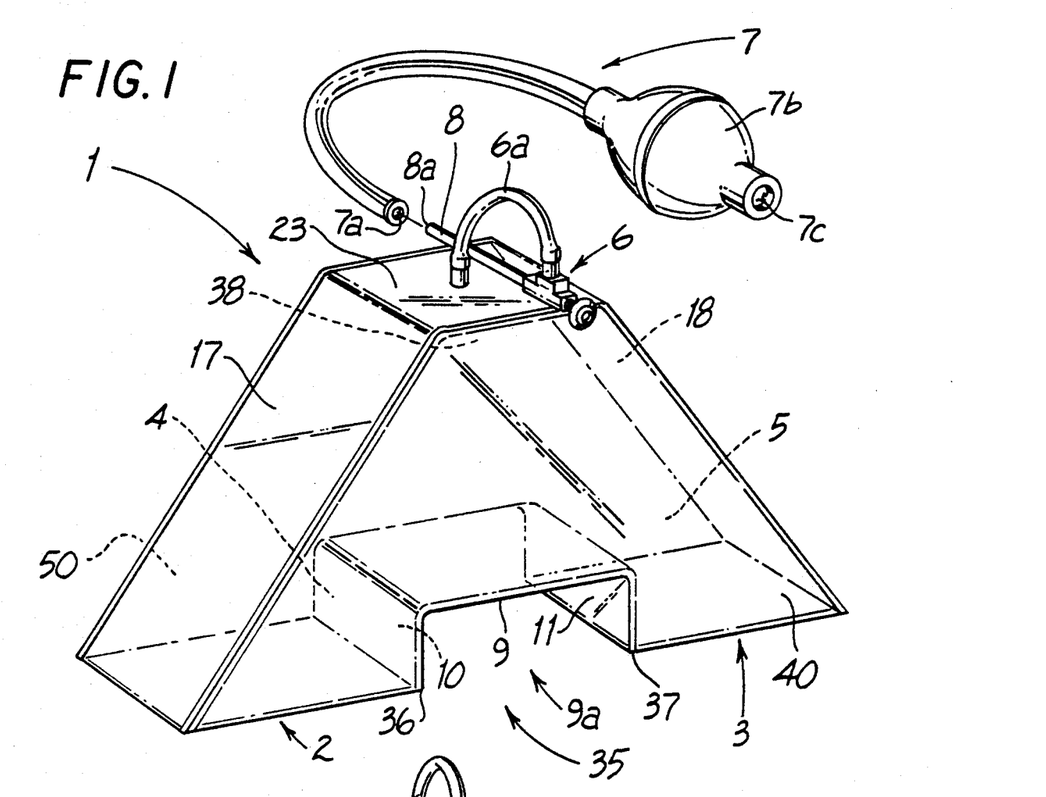
FIG. 1. shows a perspective view of the bridge portion and ball siphon of the present invention.

Referring to FIG. 1, there is provided a generally A-frame configuration arched water transfer bridge 1 with two bottom openings represented by reference numerals 2 and 3, and two passageways 4 and 5 connecting together, which passageways 4 and 5 fill with water through respective bottom openings 2 and 3 to create a passage for fish. Water transfer bridge 1 has a built in bleeder valve 6 with an air loop 6a on top for opening to allow air to be exhausted during water fill-up, and closing before removing ball siphon unit 7. Reference number 8 describes the connecting tube for the siphon hose 7a to connect siphon unit 7 to a fish tank during installation. Siphon hose 7a connects a manually squeezable ball type siphon 7b with a one way air check valve 7c in its end, to the fish tank 13.

Figure 2:
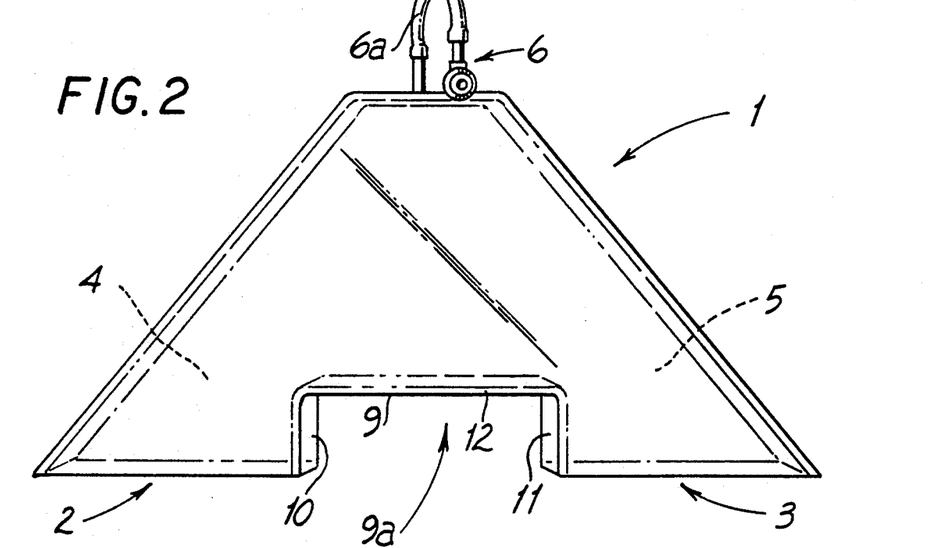
FIG. 2 shows a front elevational side view of the water transfer bridge of the present invention.
Figures 2A, 2B:
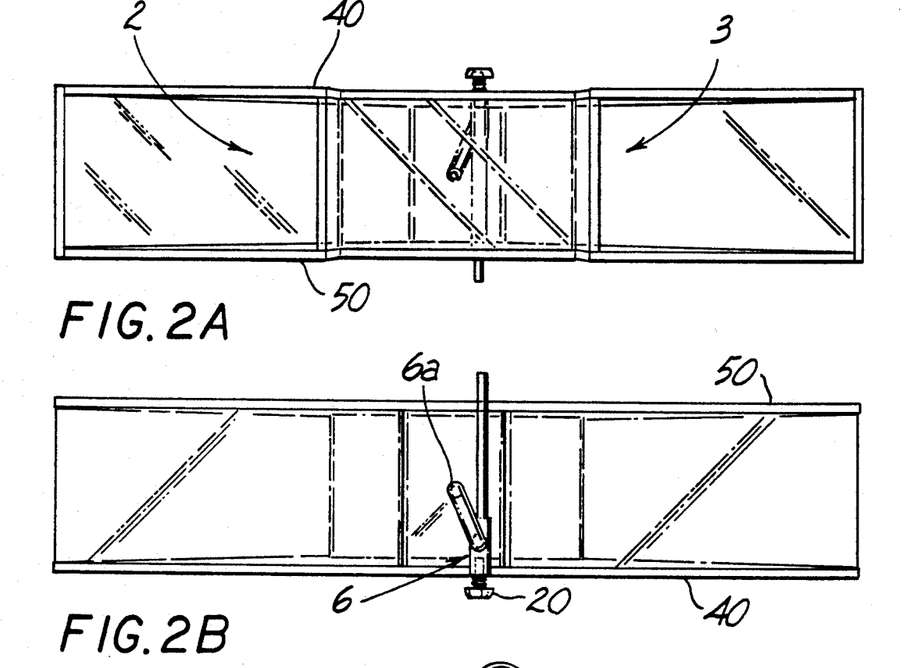
FIG. 2A is a bottom view of the bridge as in FIG. 2.
FIG. 2B is a top plan view of the bridge as in FIG. 2.
Figure 4:
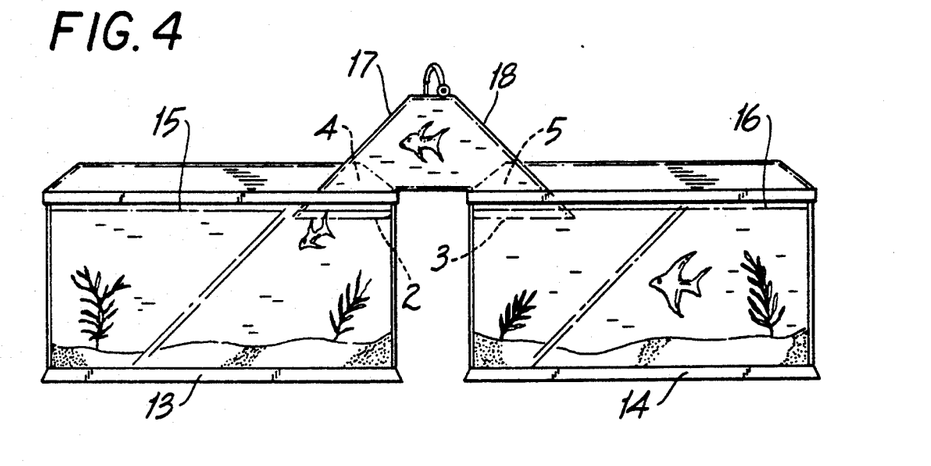
FIG. 4 is a front elevational view of the present invention as appears mounted upon two tanks of similar size, illustrating two conventional florescent type lamps fitting therein.

FIG. 2. shows a front view of the A-frame water transfer bridge 1 with bleeder valve 6 and air loop 6a positioned at the top center of bridge 1. Passageways 2 and 3 are partially separated by an abutment end 9 with recess 9a, which recess 9a is defined by upright walls 10 and 11, which walls 10 and 11 are connected to horizontal wall 12. The recess 9a enables a user to place the A-frame water transfer bridge over two conventional aquarium tanks 13 and 14, as shown in FIG. 4, so that the bottom openings 2 and 3 of passageways 4 and 5 respectively are submergable below the horizontally extending water levels 15 and 16 of tanks 13 and 14. Passageways 4 and 5 have converging walls 17 and 18, to form a peaked configuration for directing any air bubbles up to bleeder valve 6 of water transfer bridge 1, to facilitate the removal of air from the A-frame bridge 1.

As shown in FIG. 2 there is described openings 2 and 3, each opening 2 and 3 providing an entrance for water to fill passageways 4 and 5. Recess 9a of abutment 9 in the center of water transfer bridge is for resting the bridge 1 on top of the tanks 13 and 14. As shown in FIG. 4 there is alternatively provided a conventional bridge-holding member center bracket 19 for a single tank option.

FIG. 2 also shows bleeder valve 6 and air loop 6a in a center of the bridge, with a connecting tube 8 to connect to ball siphon unit 7 during evacuation of air prior to transfer of water. Air-loop 6a traps air bubbles left, to prevent inadvertent evacuation of water into ball siphon 7b, eliminating the possibility of rust in the one-way check valve 7c Bleeder screw knob 20 controls bleeder valve 6, and it screws in to close bleeder valve 6, and screws out to open and fill bleeder valve 6 with water. It also allows water to exit slowly and evenly into tanks 13 and 14.

Figure 2C:
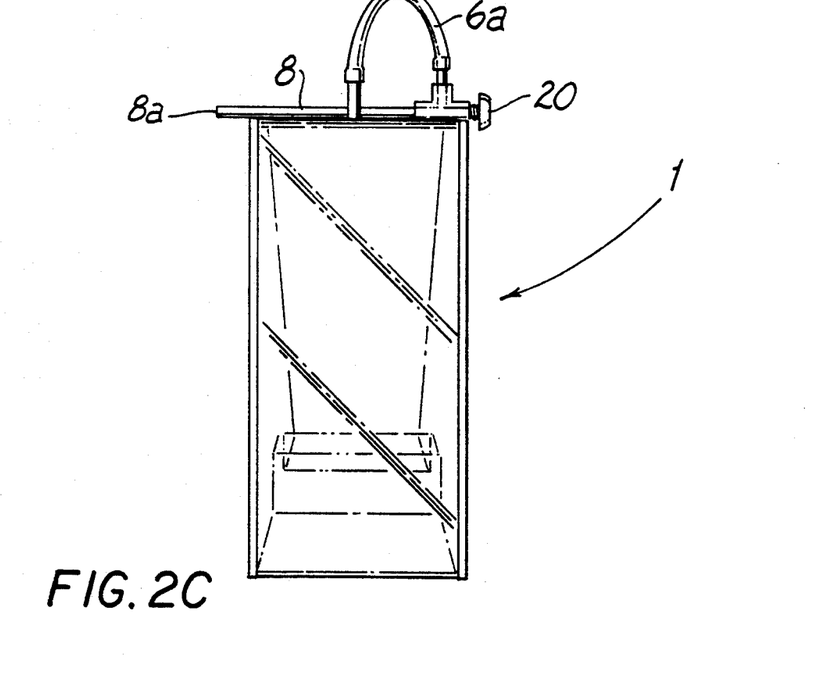
FIG. 2C is a side elevational view of the bridge as in FIG. 2.

FIG. 2C is a side elevational view of bleeder valve air loop 6a, which acts as an air bubble trap. Reference 8a represents the end of connecting tube 8 for ball siphon hose 7a of siphon unit 7.

Figure 3:
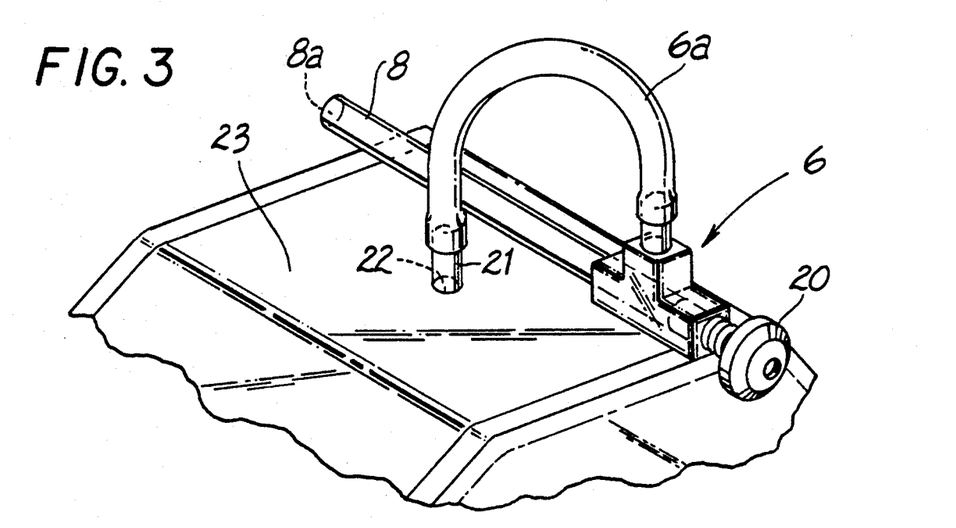
FIG. 3. is an exploded close-up perspective view of the top bleeder valve of the present invention.

FIG. 3 is an exploded perspective view of the top bleeder valve 6, showing:

a) bleeder valve needle seat screw knob 20 and b) air loop 6a. The air loop 6a is constructed of a piece of standard fish air hose, curved in its center and connected at one end with valve 6 and at the other end with air intake 21 disposed to bore hole 22, inside of top wall 23, connecting passageways 4 and 5 to create an air bubble trap.

Connecting tube 8 with outlet hole 8a connects ball siphon hose 7a of ball siphon unit 7, to valve 6 for installation.

Figure 4A:
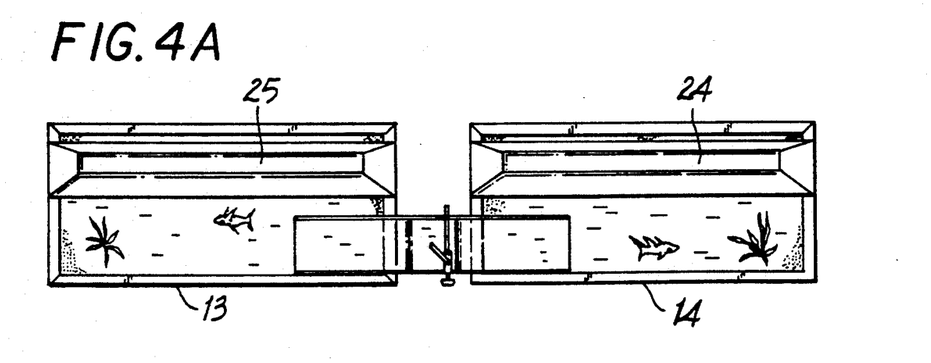
FIG. 4A is a top view of the invention as in FIG. 4.

FIGS. 4 and 4A show the water transfer bridge 1 mounted upon two tanks 13 and 14 of similar size, illustrating that two conventional aquarium florescent type lamps represented by referenced numerals 24 and 25 can still fit without interference within aquarium fish tanks 13 and 14 respectively.

Figure 5:
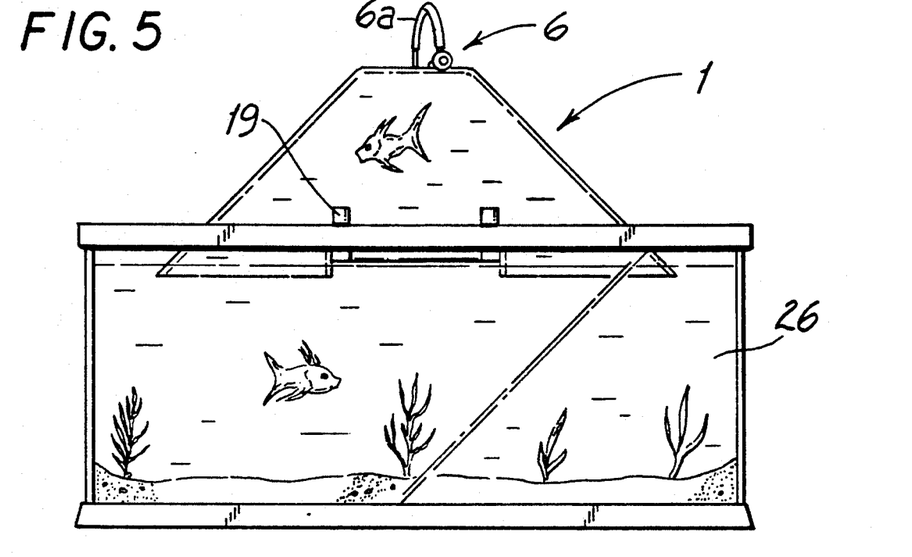
FIG. 5 is a front elevational view of the water transfer bridge of the present invention, shown in place in a single aquarium tank.
Figure 5A:
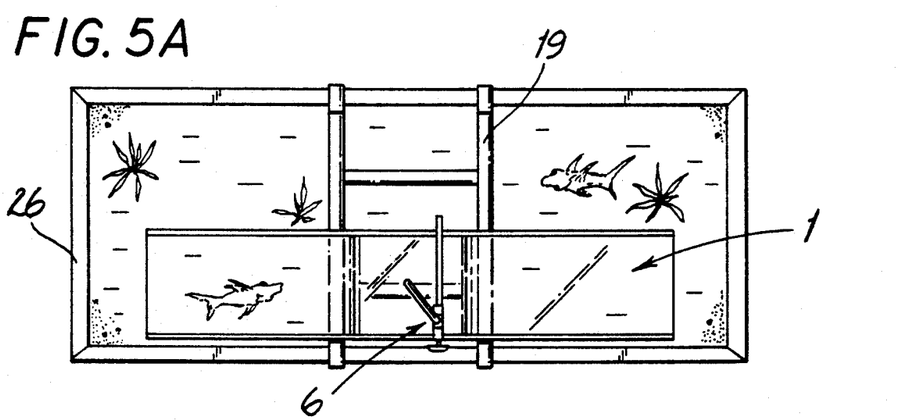
FIG. 5A is a top plan view of the bridge as in FIG. 5.

FIGS. 5 and 5A show front and top views illustrating the use in one tank 26, with the use of additional lucite rack 19.

Figure 6:
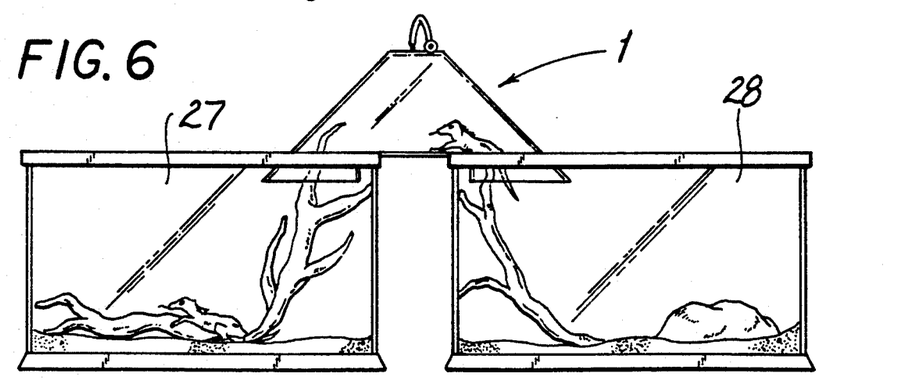
FIG. 6 is a side elevational view of another embodiment of the present invention situated in a dry terrarium.

FIG. 6 shows an alternative use of water transfer bridge 1 in two dry terrarium tanks 27 and 28, illustrating amphibious and reptile capabilities.

Figure 7:
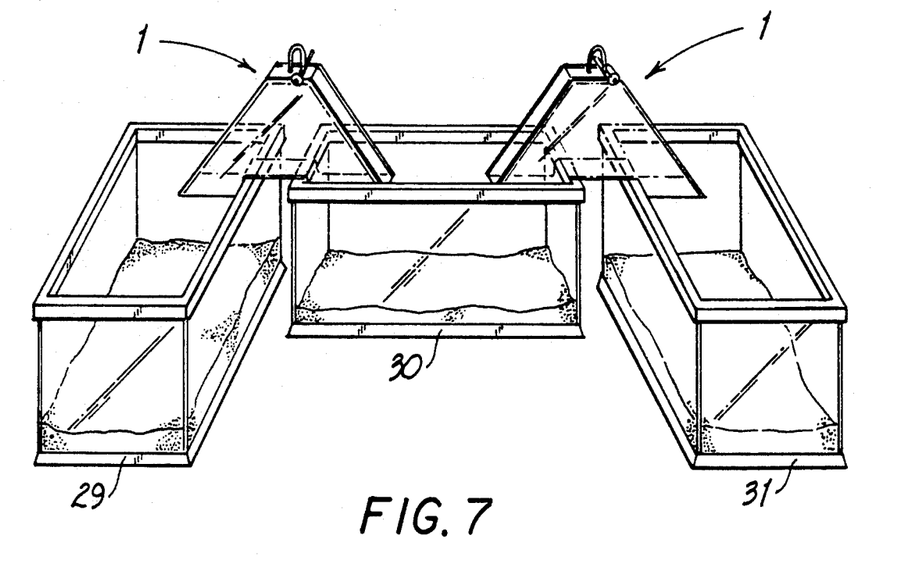
FIG. 7 illustrates the present invention in combination with three fish tank aquariums.
Figure 8:
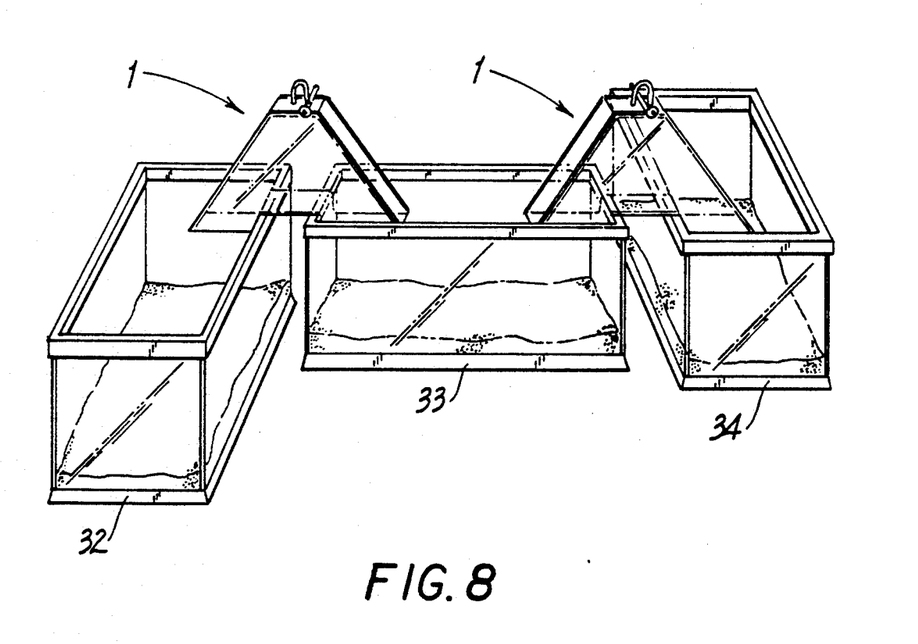
FIG. 8 illustrates the present invention used as a link between existing tanks and equipment.

FIGS. 7 and 8 illustrate how a plurality of water transfer bridges 1 can be used as a link between more than two tanks 29, 30, 31 or 32, 33, 34 to create individual design configuration concepts as the system grows, while also being quick, and easily separable for individual breakdown and cleaning.

In summary, the present invention includes an aquarium/terrarium crossover bridge assembly A-frame water transfer bridge 1 and a ball siphon unit 7 for installation, and a rack 19 for single tank use.

For installation, the A-frame water transfer bridge 1 is placed on top of two evenly spaced tanks 13 and 14, or in the center of single tank 26 where desired, on top of rack 19, with both open ends 2 and 3 submerged about ⅛ to ¾" in water. Bleeder valve 6 is opened, and, ball siphon 7b is connected to top air tube 8a by connecting tube 7a. Ball siphon 7b is manually pumped to remove air, so water will fill by the aquarium/terrarium crossover bridge assembly A-frame water transfer bridge 1 in response to reduced air pressure. When the aquarium/terrarium crossover bridge assembly A-frame water transfer bridge 1 is filled to the top, the user leaves a small air bubble in air loop 6a to keep water from intruding into and rusting inside ball siphon check valve 7c of ball siphon 7b.

Then, the ball siphon unit 7, including ball 7b and connecting tube 7a, are removed from bleeder valve 6.

The aquarium/terrarium crossover bridge assembly A-frame bridge water transfer bridge 1 will stay filled as long as water level does not drop below opening 2 and 3 of the A-frame bridge 1.

The A-frame bridge water transfer bridge 1 can also be used as a terrarium tank connector for lizards, snakes or amphibious fish or reptiles to transfer at leisure.

The aquarium/terrarium crossover bridge assembly A-frame bridge 1 is a very useful tool for the average fish, reptile or amphibian enthusiast. The aquarium/terrarium crossover bridge assembly A-frame water transfer bridge 1 is most effective when used as a separation device between two or more tanks 13 and 14 for cleaning purposes, also when providing a link to make the two or more tanks 13 and 14 all one system.

When valve 6 is opened, water will bleed out very slowly and evenly out from the aquarium/terrium crossover bridge assembly A-frame water transfer bridge 1 into both tanks. Thus, two tanks can be separated to permit the cleaning of one of them. To clean a tank 13, water is removed from it. The tank 13 is refilled, and the water is re-conditioned. Consequently, no netting of fish or removing to temporary storage is needed.

The benefits of the present invention are that it:

a) allows easy transfer of fish without stress or shocking for separations of tanks during breakdown cleaning, b) creates an elevated passageway for fish to swim at random, c) incorporates needle seat bleeder valve and air loop as not to lose water upon disconnecting ball siphon and to control water to disperse slowly and evenly and equally among tanks, d) is safe for use, e) allows creative growth of tank system quickly and easily using old equipment as well as new, uses natures forces, is all natural, and requires no electric power.

f) uses nature's forces, is all natural, and requires no electric power.

DESCRIPTION OF THE PREFERRED EMBODIMENT

The decorative water-holding A-Frame container bridge 1 for aquarium tanks, constitutes a hollow tapered structure having horizonatl top 23, bottom 35 including holes 2 and 3 and recess 9a, with two parallel, spaced apart flat vertical sides 40 an 50 extending between the top 23 and the bottom 35 vertical sides 40 and 50 are perpendicular, respectively, to and contiguous with horizontal top 23.

Two spaced apart non-parallel flat sides 17 and 18 converge toward, terminate at and are contiguous with the top surface 23, the non-parallel sides 17 and 18 further diverging toward, terminating at and contiguous with the bottom 35 of the A-Frame water transfer bridge 1. The non-parallel sides 17 and 18 and the flat top surface 23 constitute a peak for trapping air. Non-parallel sides 17 and 18 are perpendicular to and contiguous with parallel sides 40 and 50 respectively. Non-parallel sides 17 and 18 serve to separate and to space apart parallel sides 40 and 50.

The bottom 35 further includes two spaced apart wide apertures 2 and 3 with an indented flat bottom surface 12 of abutment 9 extending therebetween, the wide apertures 2 and 3 for allowing the inflow and outflow of aquarium tank water.

The indented flat bottom surface 9 has two ends 36 and 37, the flat bottom surface 9 further being offset from the wide apertures 2 and 3 by two short, flat spaced apart vertical walls 10 and 11. The walls 10 and 11 are disposed at the respective two ends 37 of the flat bottom surface 9. The indented flat bottom surface 9 serves as a mounting bracket for mounting the A-Frame water transfer bridge 1 on at least one aquarium tank, and for securely maintaining the position of the mounted A-Frame water transfer bridge 1 relative to the at least one aquarium tank.

The water transfer bridge 1 includes a means for inducing water to enter and fill the A-Frame bridge 1, a means for allowing water to drain from the A-Frame bridge 1, and a means to control air flow into and out of the A-Frame bridge 1.

The means for inducing water to enter the A-Frame bridge 1 is a manually operated ball siphon pump unit 7 having an air check valve, the ball siphon pump unit being disposed exterior to the A-Frame bridge 1 which supports at its top a manually operated air-bleeder, needle valve 6, a section of conduit tubing 21 and a bore 22 through the flat top surface 23 of the bridge 1.

The siphon pump unit 7 draws air from the bridge 1 via the bore 22. The air-bleeder needle valve 6 is mounted exteriorly on the top flat surface 23 in positional register with the bore 22. The needle valve is in air flow communication with the bore 22 and the exteriorly disposed conduit tubing section 21 and in turn with the ball siphon pump unit 7. The ball siphon pump unit 7 provides negative air pressure in the bridge 1 by withdrawing air as the siphon pump 7 is operated. The negative air pressure for induces aquarium tank water to enter the bridge 1 through the wide bottom apertures 2 and 3.

The means to control airflow into and out of the bridge 1 includes the manually operated air-bleeder needle valve 6 and the means for allowing water to drain from the bridge 1 constitutes the manually operated air-bleeder needle valve 6.

The volume of the bridge 1 includes 5% to 60% of the volume of an aquarium tank 13, and preferably from 15% to 40% of the volume of the at least one aquarium tank 13.

The decorative, water-holding transfer bridge container 1 for aquarium tanks, includes a hollow, A-shaped frame 1 having a top and a bottom, a pair of wide apertures 2 and 3 for admitting and releasing aquarium tank water, a peak portion 38 for trapping air, a means for controllably inducing water to enter and fill and alternately to drain from and empty the A-Frame bridge 1, and a means for securely mounting the A-Frame bridge 1 onto at least one aquarium tank 13.

The peak portion 38 constitutes the top of the A-Frame water transfer bridge 1, the peak 38 further comprised of two parallel spaced apart flat sides 10 and 11, and two non-parallel spaced apart flat sides 17 and 18, and a horizontal flat top surface 23. The parallel sides separate and extend between, respectively, the spaced apart non-parallel flat sides 17 and 18.

The non-parallel flat sides 17 and 18 converge toward each other toward the top of the A-Frame bridge 1. The horizontal flat top surface 9 extends between and contiguous with, respectively, the two parallel flat sides 10 and 11 and further, the horizontal flat top surface 9 extends between and contiguous with, respectively, the two nonparallel flat sides 17 and 18.

The bottom 35 further includes the two spaced apart wide apertures 2 and 3 with the indented flat bottom surface 9 extending therebetween, the wide apertures 2 and 3 for allowing the inflow and outflow of aquarium tank water.

The means for securely mounting the bridge 1 includes indented flat bottom surface 9 having two ends, the flat bottom surface 9 further being offset from the wide apertures 2 and 3 by two short, flat spaced apart vertical walls 10 and 11, the walls 10 and 11 being disposed at the respective two ends 36 and 37 of the flat bottom surface 9. The indented flat bottom surface 9 serves as a mounting bracket for mounting the A-Frame bridge 1 on at least one aquarium tank 13 and for securely maintaining the position of the mounted A-Frame bridge 1 relative to the at least one aquarium tank 13.

The means for inducing water to enter and fill the A-Frame bridge 1 includes a manually operated ball siphon pump 7 having an air check valve, the ball siphon pump 7 being disposed exterior to the A-Frame bridge 1, a manually operated air-bleeder needle valve 6, a section of conduit tubing 21 and a bore 22 through the flat top surface 23 of the A-Frame bridge 1.

The siphon pump draws air from the A-Frame water transfer bridge 1 via the bore 22. The air-bleeder needle valve 6 is mounted exteriorly on the top flat surface 23 in positional register with the bore 22. The needle valve 6 is in air flow communication with the bore 22 and the exteriorly disposed conduit tubing section 21 and in turn with the ball siphon pump 7. The ball siphon pump 7 provides negative air pressure in the A-Frame bridge 1 by withdrawing air as the siphon pump 7 is operated. The negative air pressure induces aquarium tank water to enter the A-Frame bridge 1 through the wide bottom apertures 2 and 3.

The means to control air flow into and out of the A-Frame may constitute a manually operated air-bleeder needle valve 6 for allowing water to drain from the A-Frame bridge 1.

Other modifications may be made to the present invention, without departing from the spirit and scope of the present inventor, as noted in the appended claims.

What is claimed is:

1. A decorative water-holding A-Frame crossover bridge assembly for aquarium tanks, comprising:
   a. hollow tapered structure having a recess, said recess having a top, a bottom, and two parallel, spaced apart flat vertical sides extending between the top and the bottom;
   b. two spaced apart non-parallel flat sides converging toward, terminating at and contiguous with a flat top surface, the non-parallel sides further diverging toward, terminating at and contiguous with the bottom of said A-Frame crossover bridge assembly, the non-parallel sides and the flat top surface comprising a peak for trapping air, said non-parallel sides separating said two parallel sides from each other;
   c. the bottom further comprising two spaced apart wide apertures separating said recess, said recess having an indented flat bottom surface extending therebetween, the wide apertures for allowing the inflow and outflow of aquarium tank water;
   d. the indented flat bottom surface having two ends, the flat bottom surface further being offset from the wide apertures by two short, flat spaced apart vertical walls, the walls being disposed at the respective two ends of the flat bottom surface, the indented flat bottom surface for serving as a mounting bracket for mounting the A-Frame crossover bridge assembly container on at least one aquarium tank and for securely maintaining the position of the mounted A-Frame crossover bridge assembly container relative to the at least one aquarium tank;
   e. means for inducing water to enter and fill said A-Frame crossover bridge assembly;
   f. means for allowing water to drain from said A-Frame crossover bridge assembly;
   g. means to control air flow into and out of said A-Frame crossover bridge assembly;
   wherein said means for inducing water to enter said A-Frame crossover bridge assembly container is a manually operated ball siphon pump having an air check valve, said ball siphon pump being disposed exterior to said A-Frame crossover bridge assembly container;
   a manually operated air-bleeder needle valve, a section of conduit tubing and a bore through the flat top surface of said A-Frame crossover bridge assembly container; and
   said siphon pump drawing air from said A-Frame crossover bridge assembly container via said bore, said air-bleeder needle valve being mounted exteriorly on said top flat surface in positional register with said bore, said needle valve being in air flow communication with said bore and said exteriorly disposed conduit tubing section and in turn with said ball siphon pump, said ball siphon pump for providing negative air pressure in said A-Frame crossover bridge assembly container by withdrawing air as said siphon pump is operated, said negative air pressure for inducing aquarium tank water to enter said A-Frame crossover bridge assembly container through said wide bottom apertures.

2. The device of claim 1, wherein the A-Frame container is made of transparent materials.

3. The device of claim 1, wherein said means to control airflow into and out of said A-Frame crossover bridge assembly container comprises said manually operated air-bleeder needle valve.

4. The device of claim 1, wherein said means for allowing water to drain from said A-Frame crossover bridge assembly container comprises said manually operated air-bleeder needle valve.

5. The device of claim 1, wherein said volume of said A-Frame crossover bridge assembly container comprises from 5% to 60% of said volume of said at least one aquarium tank.

6. The device of claim 1, wherein said volume of said interior of said A-Frame crossover bridge assembly container comprises from 15% to 40% of said volume of said at least one aquarium tank.

7. A decorative, water-holding A-Frame crossover bridge assembly container for aquarium tanks, comprising:
   a. a hollow, A-Shaped frame having a top and a bottom, a pair of wide apertures for admitting and releasing aquarium tank water, a peak for trapping air;
   b. means for controllably inducing water to enter and fill and alternately to drain from and empty said A-Frame;
   c. means for securely mounting said A-Frame onto at least one aquarium tank; wherein, further
   d. said peak comprising the top of said A-Frame, said peak further comprised of two non-parallel spaced apart flat sides, two parallel vertical sides, and a horizontal flat top surface, said parallel vertical sides being perpendicular to said flat top surface, said parallel sides separating and extending between said non-parallel flat sides respectively;

e. said non-parallel flat sides converging toward each other toward said top of said A-Frame;

f. said horizontal flat top surface extending between and contiguous with, the two nonparallel flat sides; and g. said bottom bearing a recess therein for mounting said A frame bridge securely on one or more aquarium tanks, said bottom further comprising two spaced apart wide apertures with an indented flat bottom surface extending therebetween, said wide apertures for allowing the inflow and outflow of aquarium tank water;

said means for securely mounting comprising an indented flat bottom surface having two ends, the flat bottom surface further being offset from the wide apertures by two parallel short, flat spaced parallel apart vertical walls, said walls being disposed at the respective two ends of said flat bottom surface, said indented flat bottom surface for serving as a mounting bracket for mounting said A-Frame on at least one aquarium tank and for securely maintaining the position of said mounted A-Frame relative to said at least one aquarium tank;

said means for inducing water to enter and fill said A-Frame comprising a manually operated ball siphon pump having an air check valve, said ball siphon pump being disposed exterior to said A-Frame;

a manually operated air-bleeder needle valve, a section of conduit tubing and a bore through said flat top surface of said A-Frame; and said siphon pump drawing air from said A-Frame via said bore, said air-bleeder needle valve being mounted exteriorly on said top flat surface in positional register with said bore, said needle valve being in air flow communication with said bore and said exteriorly disposed conduit tubing section and in turn with said ball siphon pump, said ball siphon pump for providing negative air pressure in said A-Frame by withdrawing air as said siphon pump is operated, said negative air pressure for inducing aquarium tank water to enter said A-Frame through said wide bottom apertures.

8. The device of claim 7, wherein said means to control air flow into and out of the A-Frame comprises a manually operated air-bleeder needle valve.

9. The device of claim 8, wherein said means for allowing water to drain from said A-Frame comprises a manually operated air-bleeder needle valve.

10. The device of claim 8, wherein the volume of said A-frame comprises from 5% to 60% of the volume of said at least one aquarium tank.

11. The device of claim 8, wherein the volume of said interior of said A-Frame is from 15% to 40% of the volume of said at least one aquarium tank.

12. The device of claim 7, wherein said A-Frame is made of transparent materials.

* * * * *